US007962347B2

(12) United States Patent
Anthony-Hoppe et al.

(10) Patent No.: US 7,962,347 B2
(45) Date of Patent: *Jun. 14, 2011

(54) ADVISOR REFERRAL

(75) Inventors: Trudy K. Anthony-Hoppe, Woodinville, WA (US); Louis S. Harvey, Cohasset, MA (US); Denis Lavoie, Seattle, WA (US); John D. Skovron, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,063

(22) Filed: Jun. 11, 2010

(65) Prior Publication Data

US 2010/0268669 A1 Oct. 21, 2010

Related U.S. Application Data

(63) Continuation of application No. 09/565,274, filed on May 4, 2000, now Pat. No. 7,752,054.

(51) Int. Cl.
G06Q 10/00 (2006.01)

(52) U.S. Cl. ........................................................ 705/1.1
(58) Field of Classification Search ................... 705/1.1
See application file for complete search history.

(56) References Cited

U.S. PATENT DOCUMENTS

| 5,884,272 | A | 3/1999 | Walker et al. |
| 5,963,951 | A | 10/1999 | Collins |
| 6,012,053 | A | 1/2000 | Pant et al. |
| 6,052,122 | A | 4/2000 | Sutcliffe et al. |
| 6,098,066 | A | 8/2000 | Snow et al. |
| 6,275,229 | B1 | 8/2001 | Weiner et al. |
| 6,311,178 | B1 | 10/2001 | Bi et al. |
| 6,374,237 | B1 | 4/2002 | Reese |
| 6,393,415 | B1 | 5/2002 | Getchius et al. |
| 6,519,585 | B1 | 2/2003 | Kohli |
| 7,752,054 | B1 | 7/2010 | Anthony-Hoppe |
| 2001/0034630 | A1 | 10/2001 | Mayer et al. |
| 2002/0010614 | A1 | 1/2002 | Arrowood |

FOREIGN PATENT DOCUMENTS

WO WO-9712334 4/1997

OTHER PUBLICATIONS

"Advisory Action", U.S. Appl. No. 09/565,274, (Nov. 22, 2004),3 pages.
"Advisory Action", U.S. Appl. No. 09/565,274, (Jun. 17, 2003),3 pages.
"Advisory Action", U.S. Appl. No. 09/565,274, (Sep. 15, 2005),3 pages.
"Calvert to Launch Online Broker Referral Program", *Fund Marketing Alert*, No. 2, (Jan. 10, 2000),1 page.

(Continued)

*Primary Examiner* — Jonathan Ouellette

(57) ABSTRACT

An apparatus and method for an advisor referral tool for objectively matching professional services between users and advisors in an on-line or computer based environment. The advisor referral tool matches users with professional advisors by executing an advisor matching algorithm to select a subset of advisors from an advisor database based on user selected search criteria. A server computer calculates a percent match value for each advisor in the subset of advisors that corresponds to consumer responses to predetermined psychographic/profile questions. The server computer then creates a best fit advisor list of advisors from the subset of advisors that is based on the calculated percent match value. The best fit advisor list is then transmitted to and displayed on the user's computer.

20 Claims, 12 Drawing Sheets

OTHER PUBLICATIONS

"Final Office Action", U.S. Appl. No. 09/565,274, (Mar. 13, 2003),5 pages.
"Final Office Action", U.S. Appl. No. 09/565,274, (May 23, 2006),15 pages.
"Final Office Action", U.S. Appl. No. 09/565,274, (Jul. 21, 2005),8 pages.
"Final Office Action", U.S. Appl. No. 09/565,274, (Sep. 30, 2004),8 pages.
"Financial Advisor Pages", *Retrieved from: Internet Archive Wayback Machine*, http://www.fapages.com> on Apr. 1, 2004, 7 pages.
"Hundreds of CPAs with Personal Financial Specialist—PFS—credential are now available in TheRightAdvisor.com, a new service from MSN MoneyCentral and DALBAR", *Business Wire*, (Nov. 4, 1999),4 pages.
"Non-Final Office Action", U.S. Appl. No. 09/565,274, (Oct. 22, 2003),6 pages.
"Non-Final Office Action", U.S. Appl. No. 09/565,274, (Oct. 28, 2009),7 pages.
"Non-Final Office Action", U.S. Appl. No. 09/565,274, (Nov. 8, 2002),7 pages.
"Non-Final Office Action", U.S. Appl. No. 09/565,274, (Dec. 22, 2005),11 pages.
"Non-Final Office Action", U.S. Appl. No. 09/565,274, (Feb. 28, 2005),6 pages.
"Non-Final Office Action", U.S. Appl. No. 09/565,274, (Apr. 8, 2004),6 pages.
"Notice of Allowance", U.S. Appl. No. 09/565,274, (Feb. 26, 2010),6 pages.
"Questionaire Helps Investors Understand Money Personality", *Variable Annuity Market News*, No. 7, (Jul. 1998),2 pages.
"Schwab AdvisorSource Refers Record Number of Investors to Local Financial Advisors During First Quarter", *PR Newswire*, (Apr. 1, 1999),2 pages.
"Screen Print of InvestorAdvisor", *Retrieved from: Internet Archive Wayback Machine*, <http://www.investoradvisor.com> on Mar. 5, 2003, (Nov. 28, 1999),3 pages.
"The Right Advisor", *Retrieved from: Internet Archive Wayback Machine*, <http://therightadvisor.com> on Oct. 15, 2003, (Oct. 13, 1999),11 pages.
Futrelle, David "Clicking your Way to a Financial Planner", *Money*, vol. 28, No. 12, (Dec. 1999),3 pages.
Klein, Melissa "New Web Service Matches Clients, Financial Partners", *Accounting Today*, (Aug. 9, 1999),2 pages.
Scott, Carolyn "How to Find an Economic Consultant", *The Consultant's Corner, Business Economics*, vol. 33, No. 4, (Oct. 1998),3 pages.

Address: http://

Advisor Matching Profile. Click the option that fits you best. The more selections you make, the more accurate your results will be.

| | Strongly Agree | Agree | Disagree | Strongly Disagree |
|---|---|---|---|---|
| 1. I want to avoid risks even if I miss great opportunities | ○ | ○ | ○ | ○ |
| 2. I am clear about my priorities and the services I need | ○ | ○ | ○ | ○ |
| 3. I prefer a professional who will not be Involved with personal matters | ○ | ○ | ○ | ○ |
| 4. I usually prefer written communication to meeting In person | ○ | ○ | ○ | ○ |
| 5. In most circumstances I prefer using the phone to using e-mail. | ○ | ○ | ○ | ○ |
| 6. I want a professional who Will deal only With the issues that I raise | ○ | ○ | ○ | ○ |
| 7. I like discussing issues thoroughly before making decisions. | ○ | ○ | ○ | ○ |
| 8. I prefer detailed explanations of all alternatives to brief answers | ○ | ○ | ○ | ○ |
| 9. I need an advisor who offers many services not a specialist | ○ | ○ | ○ | ○ |
| 10. I prefer working With a female | | | | |
| 11. I prefer working With an older professional | | | | |

460 ◀

Compensation Methods
Many financial professionals offer their clients several options for how to pay for services. Check those options that you are Willing to consider.

465 ◀  ○ asset fee  ○ hourly fee  ○ flat fee/retainer  ○ commissions
       462 ◀      464 ◀        466 ◀              468 ◀

Fig. 4A

ADVISOR REFERRAL

CROSS-REFERENCE

This application is a continuation of and claims priority to U.S. patent application Ser. No. 09/565,274, entitled "Advisor Referral Tool," filed on May 4, 2000, the disclosure of which is incorporated herein by reference in its entirety.

BACKGROUND

The search for professional services is and has been a continuing need for many years. The types of services needed can relate to financial management, insurance, estate advice, investment management, and retirement planning just to name a few.

Common approaches of finding a professional advisor in the past have comprised personal referrals from a friend or relative, professionals in other fields, published listings in yellow pages, or listings from accredited organizations. However, these approaches have their drawbacks. These approaches are typically subjective and based on the personal or biased ties of the referring party rather than on the specific objective needs of the consumer. Published listings can be inappropriate where there is no qualification or performance rating of the advisors comprised in the published listing. Additionally, referrals by an organization may be biased where that organization only recommends advisors who are members of the organization or who transact business with the organization. Thus, the customer needs are not objectively considered.

Other approaches for finding advisors comprise in-person meetings with professionals to discuss a customer's needs. The professional advisor can then individually consider the customer's needs and make advisor recommendations at a later date. This approach can be productive but is typically time consuming. The approach requires the customer to take time out of his/her day for an in-person meeting with the advisor. This can be difficult if customers have to travel to the meeting or cannot meet during normal business hours. Another approach to find professional advisors has come about as a result of the proliferation of users on the Internet.

The Internet is an interconnection of multiple worldwide networks and computers on a global scale. The networks and computers are tied together by a common protocol, TCP/IP. In the Internet, a "client" computer that is connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols comprise Hypertext Transfer Protocol (HTTP), File Transfer Protocol (PTP), Simple Mail Transfer Protocol (SMTP), Gopher and other protocols.

The HTTP protocol is used to access data on the World Wide Web, often referred to as "the Web." The World Wide Web is a multi-media information service on the Internet providing documents and links between documents. The World Wide Web is made up of numerous Web sites around the world that maintain and distribute Web documents or Web pages. A Web site may use one or more Web server computers that are able to store and distribute documents, to those accessing the Web site, in one of a number of formats including the Hypertext Markup Language (HTML). An HTML document can contain text, graphics, audio clips and video clips, or commands providing formatting information. HTML documents can also comprise embedded links, such as URLs, that reference other data or Web pages located on the local computer or network server computers. "URL" is an abbreviation for "Uniform Resource Locator," the global address of documents and other resources on the World Wide Web.

FTP is the protocol used on the Internet for sending files. Further, SMTP is a protocol for sending e-mail messages between servers. Most e-mail systems that send mail over the Internet use SMTP to send messages from one server to another; the messages can then be retrieved with an email client. In addition, SMTP is generally used to send messages from a mail client to a mail server.

A Web browser is a client application, software component, or operating system utility that communicates with server computers via FTP and HTTP protocols, or other protocols. Web browsers receive Web documents (i.e., Web pages) from the network and present them to a user. Internet Explorer, available from Microsoft Corporation, of Redmond, Wash., is an example of a popular Web browser.

The Internet has been growing in popularity and many users have started utilizing their Web browsers to locate, among other things, professional advisors. As a result, many professional advisors have begun to advertise their services on the Internet to attract new customers. These advertisements typically take the form of web pages or web sites that can be accessed and viewed by anyone having access to a computer with a browser, e.g., Internet Explorer. However, advisor web site advertisements typically only contain information about a particular advisor and the services being offered. There may be a contact phone number or e-mail address where a viewer can send inquiries. A user may usually visit various advisors Web sites to learn about different services offered. Additionally, the drawbacks mentioned above, i.e., subjective and biased referrals, are also present in this web-based approach to finding professional advisors. A customer is still unable to objectively find a professional advisor that can match his needs.

SUMMARY

The advisor referral tool is a computer-executable system and method for objectively matching professional services between users and advisors in a computer based environment. Some embodiments can be stored as computer-executable instructions on a computer-readable medium. In the advisor referral tool, the user creates advisor search criteria that outlines the customer's needs. An advisor matching algorithm is then executed that can query a database containing advisor records based on the user's search criteria. The advisor matching algorithm can then output a list of matching advisors from the database. In the advisor referral tool, the consumer input is comprised of certain consumer selection criteria and consumer answers to predetermined psychographic or profile questions. Some embodiments include a computer system that has a display device for rendering a graphical user interface of a web browser displaying a web page in a browser pane.

BRIEF DESCRIPTION OF THE DRAWINGS

FIG. 4A shows a Web browser displaying a bottom portion of the third "My Profile" Web page of FIG. 4 for selection of the second search criteria in accordance with some embodiments.

DETAILED DESCRIPTION

Some embodiments provide an apparatus and method for an on-line or computer based advisor referral tool that matches consumers desiring or needing professional services and advisors offering such services. The advisor referral tool makes use of an advisor-matching algorithm combined with an interactive on-line or computer based environment. The matching algorithm selects a list of matching advisors, selected from a server database, based on user selected search criteria. Some embodiments are more fully described with reference to FIGS. 1-9.

Figure 1:
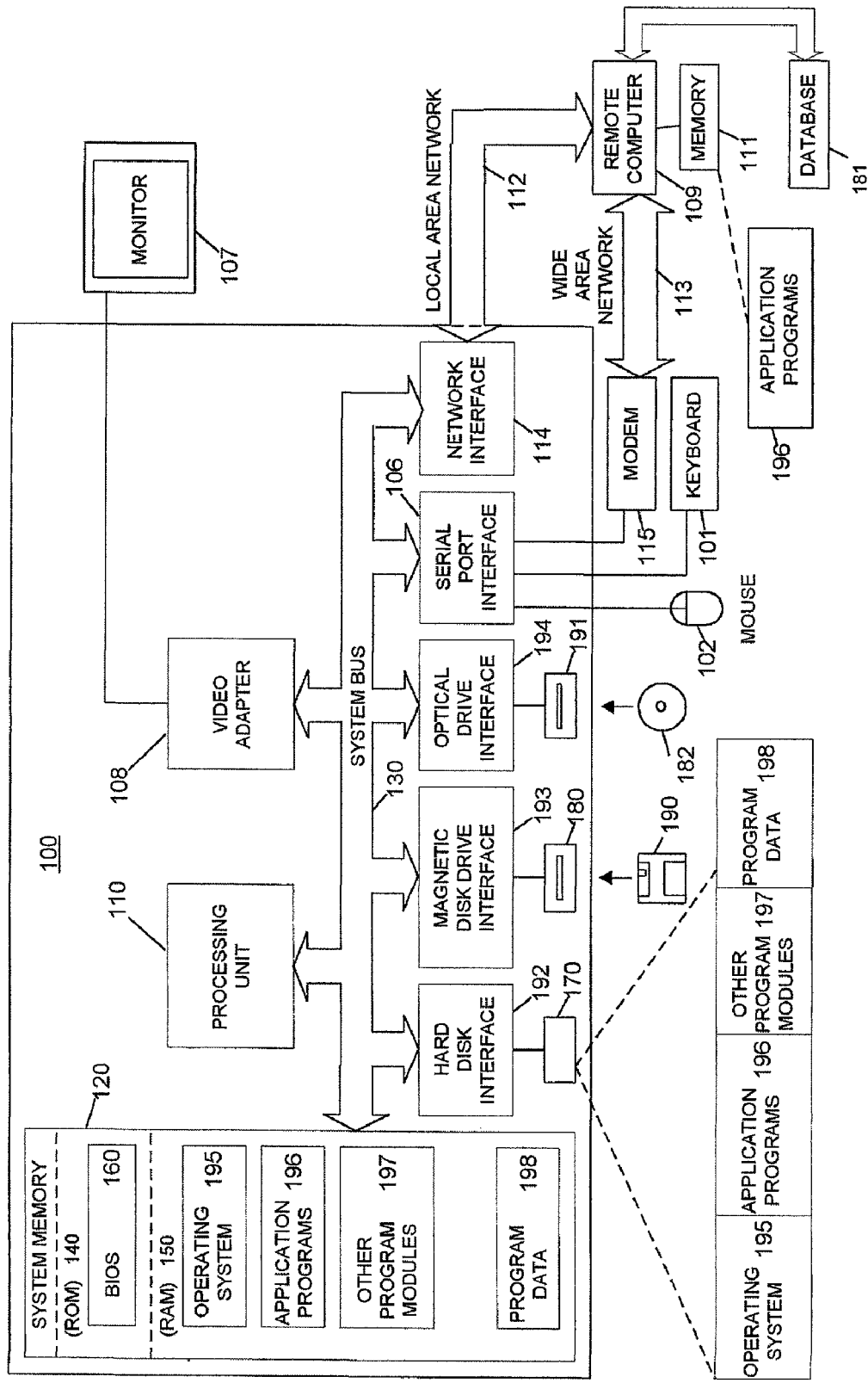
FIG. 1 is a schematic block diagram of a conventional general-purpose digital-computing environment in accordance with some embodiments.

In some embodiments, a Web browser executes on a computer, such as a general-purpose personal computer. FIG. 1 and the following discussion is intended to provide a brief, general description of a suitable computing environment in which some embodiments may be implemented. Some embodiments are described in the general context of computer-executable instructions, such as program modules, being executed by a personal computer. Generally, program modules comprise routines, programs, objects, components, data structures, etc. that perform particular tasks or implement particular abstract data types. Moreover, those skilled in the art can appreciate that some embodiments may be practiced with other computer system configurations, including hand-held devices, multiprocessor systems, microprocessor-based or programmable consumer electronics, network PCs, minicomputers, mainframe computers and the like. Some embodiments may also be practiced in distributed computing environments where tasks are performed by remote processing devices that are linked through a communications network. In a distributed computing environment, program modules may be located in both local and remote memory storage devices.

Referring to FIG. 1, an exemplary system for implementing the various aspects of some embodiments comprise a general-purpose digital-computing device in the form of a conventional personal computer. The personal computer 100 comprises a processing unit 110, a system memory 120 and a system bus 130 that couples various system components including the system memory 120 to the processing unit 110. System bus 130 may be any of several types of bus structures including a memory bus or memory controller, a peripheral bus, and a local bus using any of a variety of bus architectures. System memory 120 comprises a read only memory (ROM) 140 and a random access memory (RAM) 150.

A basic input/output system (BIOS) 160 containing the basic routines that help to transfer information between elements within the computer 100, such as during start-up, is stored in ROM 140. The personal computer 100 also comprises a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It can be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 182, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may comprise a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically comprise other peripheral output devices (not shown), such as speakers and printers.

The personal computer 100 can operate in a networked environment using logical connections to one or more remote computers, such as a remote computer 109. Each remote computer 109 may be another personal computer, a server, a router, a network PC, a peer device or other common network node and typically comprises many or all elements described relative to the personal computer 100, although only a memory storage device 111 has been illustrated in FIG. 1. In addition, in some embodiments, the remote computer 109 may be coupled to information databases 181 and 182 such that the computer can query and retrieve information and data records from the databases 181 and 182 upon execution of specified commands. The logical connections depicted in FIG. 1 comprise a local area network (LAN) 112 and a wide area network (WAN) 113. Such networking environments are commonplace in offices, enterprise-wide computer networks, intranets and the Internet.

As depicted in FIG. 1, the remote computer 109 can communicate with the personal computer 100 via the local area network 112 or via the wide area network 113. When used in a LAN networking environment, the personal computer 100 is connected to the local area network 112 through a network interface or adapter 114. When used in a WAN networking environment, the personal computer 100 and remote computer 109 may both comprise a modem 115 or other means for establishing communication over the wide area network 113, such as the Internet. The modem 115, which may be internal or external, is connected to the system bus 130 via a serial port interface 106. In a networked environment, program modules depicted relative to the personal computer 100, or portions thereof, may be stored in the remote memory storage device 111.

It can be appreciated that the network connections shown are exemplary and other means of establishing a communications link between the computers can be used. The existence of any of the various well-known protocols, such as TCP/IP, "ETHERNET", FTP, HTTP and the like, is presumed. Additionally, it is presumed that the system can be operated in a client-server configuration to permit a user to retrieve web pages from a web-based server. For example, in some embodiments, the remote computer 109 is a server having stored thereon one or more documents that may be accessed by the computer 100.

Figure 2:
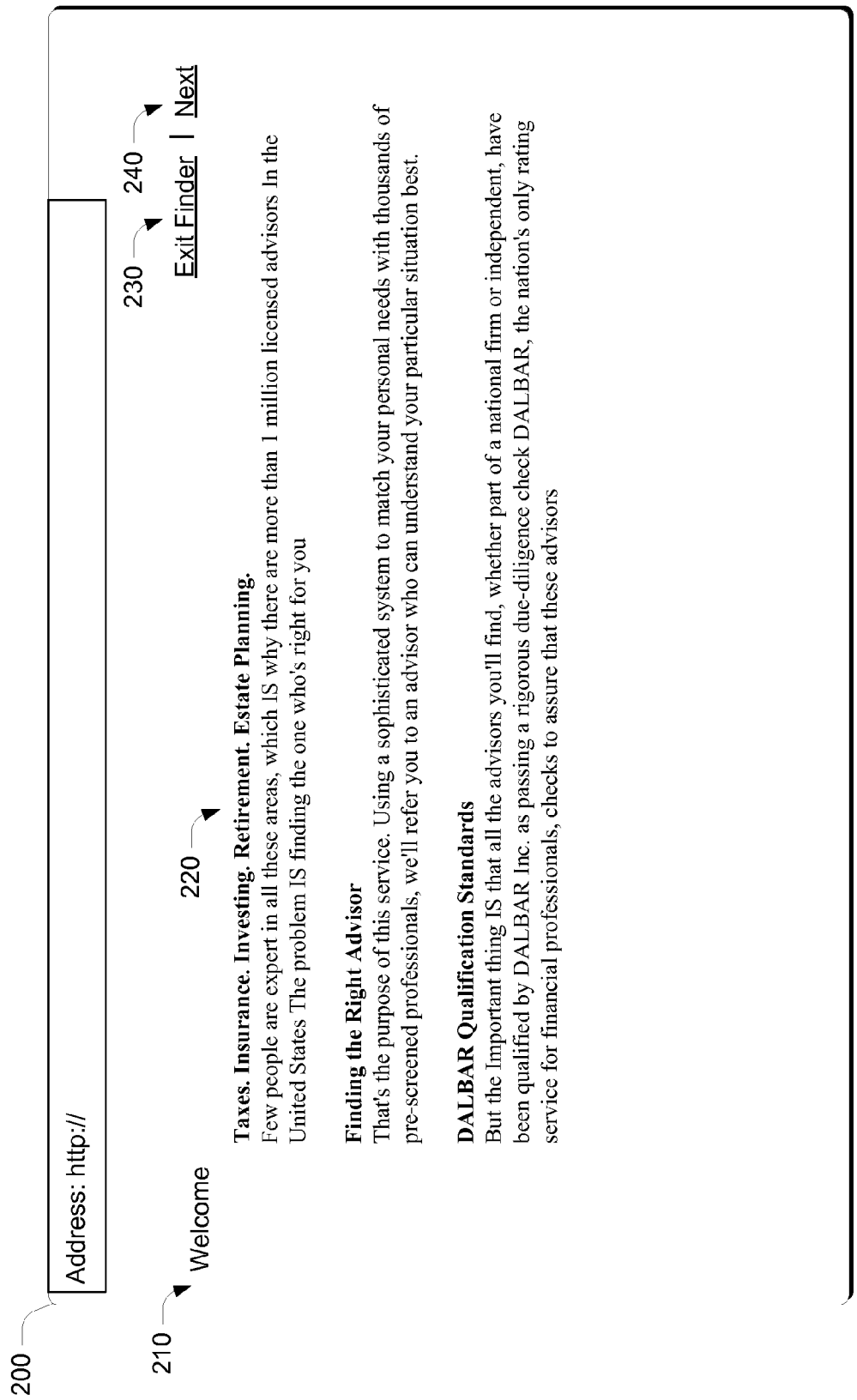
FIG. 2 shows a Web browser displaying an exemplary first "Welcome" Web page in accordance with some embodiments.

FIG. 2 shows a Web browser displaying an exemplary first Web page 200 in accordance with some embodiments and is known as the "Welcome" page 210. In one embodiment, the first Web page 200 of the advisor referral tool is accessed from a remote computer or Web server 109 (shown in FIG. 1), e.g., a Web server coupled to a network maintained by Microsoft corporation. The user can directly access the "Welcome" page 210 by entering the appropriate URL address. The first Web page 200 comprises introductory material and information 220 about the advisor referral tool. The first Web page 200 may comprise various hyperlinks that can link the user to other information documents or that allow the user to begin using some embodiments. For example, a first hyperlink such as "Exit Finder" 230 could allow the user to exit the advisor referral tool program. A second hyperlink such as the "Next" link 240 could allow the user to enter the next web page in the advisor tool may also be included. In the embodiment shown in FIG. 2, the user can begin the Advisor Finder program by selecting the "Next" link 240. Other labels could of course be used for these links depending on the function/action to be taken, for example, "Start", "Continue", "Stop", etc.

Figure 3:
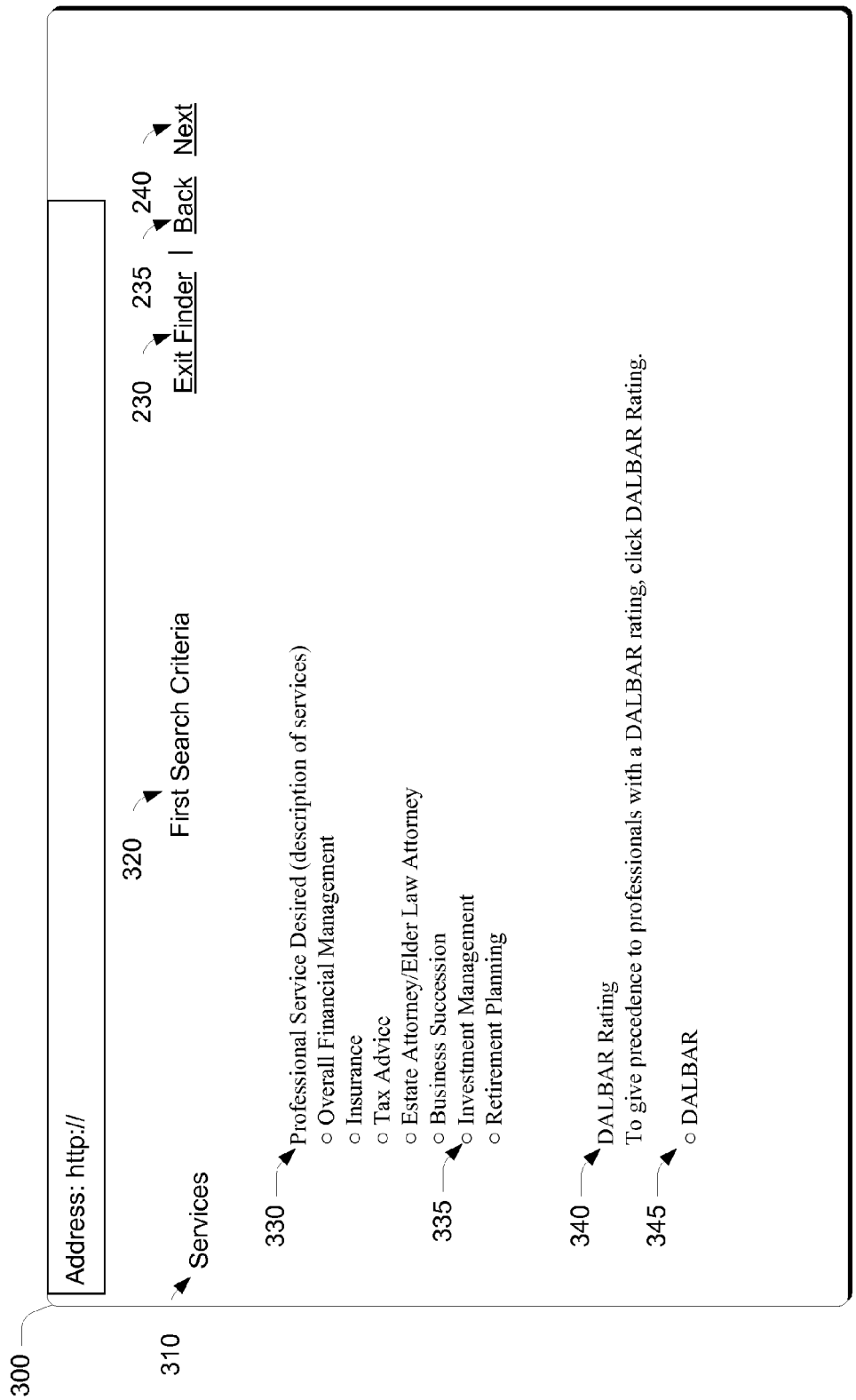
FIG. 3 shows a Web browser displaying a second "Services" Web page for selection of a first search criteria in accordance with some embodiments.

FIG. 3 shows a Web browser displaying an exemplary second Web page 300 in accordance with some embodiments and is known as the "Services" page 310. In some embodiments, the second Web page 300 uses the "Exit Finder" link 230 and the "Next" link 240 which allows the user to enter the next web page in the advisor tool. In addition, the second Web page 300 also has a "Back" hyperlink 235 that can allow the user to return to the previous Web page, i.e., the first Web page 200.

At the second Web page 300, the user creates a first search criteria 320 that can be used to query at least one database 181 that is coupled to the Web server 109 (shown in FIG. 1). The first search criteria 320 can be comprised of any one or more items such as the type of service required, advisor location, advisor experience, advisor qualification rating preference, fee structures, etc. In the embodiment illustrated in FIG. 3, the first search criteria 320 is comprised of the service required and a qualification rating preference, labeled "Professional Service Desired" 330 and a "DALBAR Rating" 340 respectively. The first search criteria 320 could of course be comprised of other items and labels.

The user selects the professional service desired by choosing the appropriate circular window 335 on the screen. The user can select or "click" one circular window 335 from a set of, for example, seven predetermined categories of professional services offered. The categories are under a heading "Professional Services Desired" and comprise:

| | |
|---|---|
| Overall Financial Management | Business Succession |
| Insurance | Investment Management |
| Tax Advice | Retirement Planning |
| Estate Attorney/Elder Law | |

Of course, those skilled in the art can readily recognize that any combination of these categories or other categories of professional services may be comprised in this list.

The user also determines whether or not he/she wishes to search for advisors that have a certain qualification rating. Such a qualification rating can include State or Board rating or certification, an organizational or institutional rating, organization memberships, as well other qualifications. In the embodiment of FIG. 3, a DALBAR Rating 340 is an option the user may select as part of the first search criteria 320. The DALBAR rating 340 is given to certain select professionals who meet predetermined standards for quality and customer service as determined by a private entity such as Dalbar, Inc. If the user desires to give preference to DALBAR rated professionals, he/she may select the "DALBAR rating *", otherwise no preference can be given to DALBAR rated professionals. The user can choose the DALBAR by entering or "clicking" the square window 345 on the screen. DALBAR rated professionals will be give preference over non-DALBAR rated advisors in an advisor matching algorithm (discussed in FIG. 9) used in compiling an advisor list for the user. If the user does not "click" the DALBAR Rating window 345, it can be presumed that the user does not have a preference for a DALBAR rated advisor.

Having selected the first search criteria 320, the user proceeds to the succeeding Web page screen by selecting the "Next" link 240. At this point, a database 181 of professional advisors is queried to determine which professionals most closely match the first search criteria 320.

Figure 4:
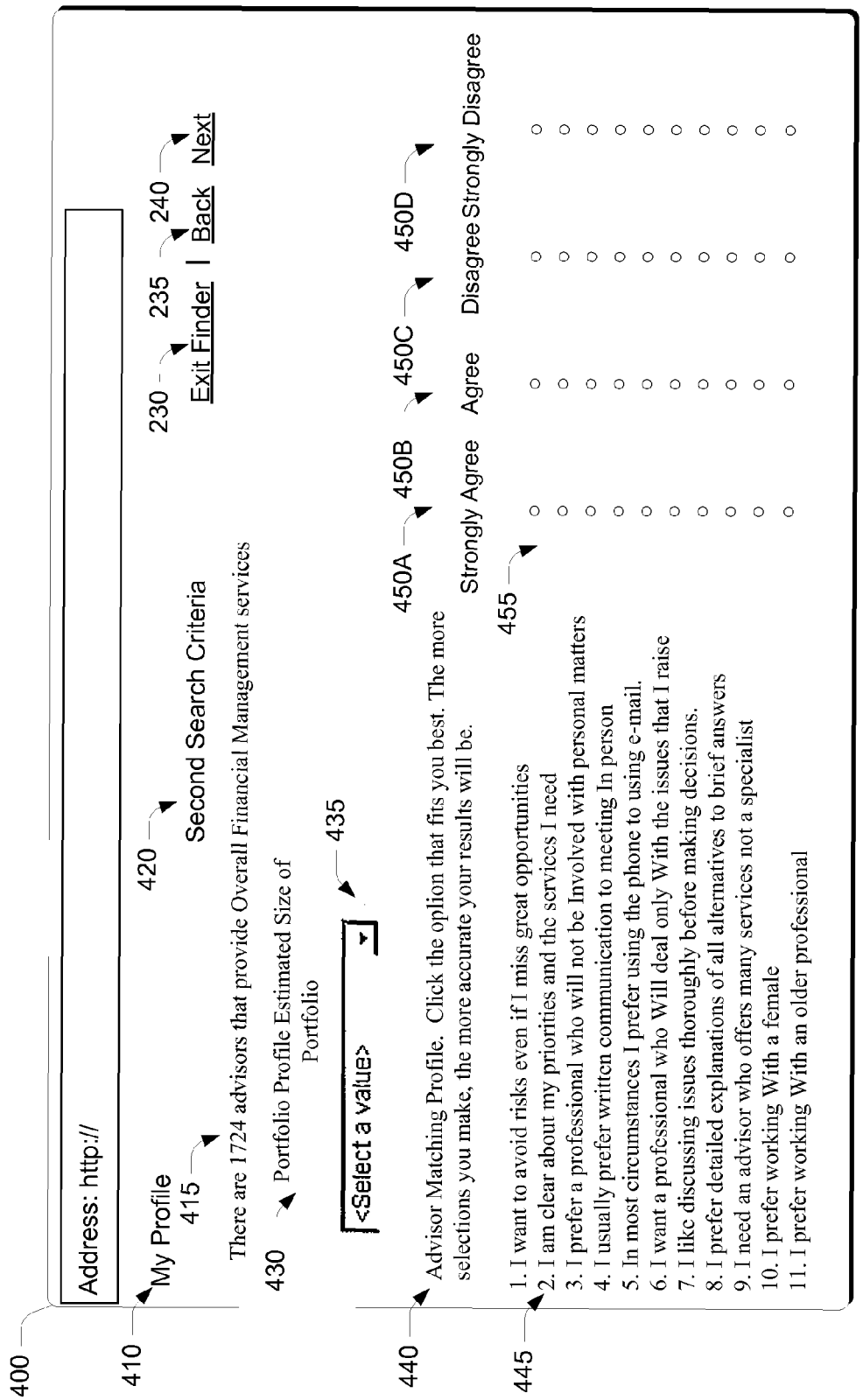
FIG. 4 shows a Web browser displaying a top portion of a third "My Profile" Web page for selection of a second search criteria in accordance with some embodiments.

FIG. 4 shows an exemplary third Web page 400 known as "My Profile" page 410. The third Web page 400 shows the results of the first query in the second Web page 300. In this embodiment, the user is given a numerical indication of how many advisors from the queried database 181 matched the user's first search criteria 320. In an alternate embodiment, a list could be displayed of all of the advisors that met the first search criteria 320 instead of the numerical indication 415 shown in FIG. 4. The result is a first subset of advisors 415 from the advisor database 181. In some embodiments, the user is only given an indication of the quantity of professional that met the first search criteria 320. The third Web page 400 also has the "Exit Finder" 230, the "Back" 235, and the "Next" 240 hyperlinks. The "Back" hyperlink 235 in this embodiment allows the user to return to the previous Web page, i.e., the second Web page 300. The user can then make desired modifications to the first search criteria 320 and revise the database 181 query.

Having received a first subset 415 of matching advisors, the user creates a second search criteria 420 that can be used to further query the first subset of advisors 415 in the database 181 (shown in FIG. 1). As before, the second search criteria 420 can be comprised of various criteria items. In this case, the search criteria are comprised of a "Portfolio Profile" 430, an "Advisor Matching Profile" 440 and "Compensation Selection" 460 (shown in FIG. 4A).

In the particular embodiment shown by FIG. 4, the user selects one range profile 430 of portfolio size 435 listed under the heading "Portfolio Profile" that encompasses the estimated value of the user's own portfolio. This is because the professional service desired 330, in the first search criteria 320, was selected 335 to be "Overall Financial Management" (shown in FIG. 3). The makeup of the range profile 430 in the second search criteria 420 may be different depending on the professional service selected by the user in the first search criteria 320. The range profile 430 may require different information from the user depending on the type of service selected 335 in the first search criteria 320. For example, where the user selects Overall Financial Management, Investment Management, or Retirement Planning Services, the user can be asked to select 435 an estimated size of portfolio in the range profile 430. If the user selects Tax Advice or Insurance services, he/she can be asked to select an estimated household income in the range profile 430. If the user selects Estate Attorney/Elder Law Attorney, he/she can be asked to select an estimated size of estate in the range profile. The user can be asked to select estimated annual sales or revenues in the range profile, if the user selects the Business Succession service in the first search criteria. Those of skill in the art will recognize that the user can be asked to select other characteristics for the range profile 430 that depend on the type of service selected in creating the first search criteria 320.

The user next answers a series of predetermined matching profile statements, or psychographic questions 445 under the heading "Advisor Matching Profile" 440. In the embodiment shown in FIG. 4, there are eleven matching profile questions 445. However, those skilled in the art will readily recognize that a greater or lesser number of profile questions 445 may be used. In addition, the content of the question may be modified or changed as well.

The user can answer any of the profile questions 445 he wishes. In addition, the user can decide not to answer some questions if he/she does not agree with the answer choices provided. However, in the embodiment of FIG. 4, the user should answer at least five questions 445 to have a valid second search criteria 420. Those of skill will readily recognize that the requirement of five answers can be varied either higher or lower.

For each profile statement 445, the user is given a choice of answers. In this embodiment, the user is presented with four answers to choose from 450A-D. The user can select Strongly Agree 450A, Agree 450B, Disagree 450C, or Strongly Disagree 450D. In some embodiments, additional or different answer choices can be provided for the profile questions. For example, there could be a "Neutral" category, or "None", or "Not Applicable", etc.

In the embodiment of FIG. 4, eleven profile questions 445 are presented and the user selects answers to at least five profile questions 445. The answers are selected by "clicking" the appropriate circular window 455 for each question 445.

Each question 445 answered by the user can be weighted and assigned a predetermined value that can be used in an advisor matching algorithm (discussed in FIG. 9) to compare against corresponding questions answered previously by advisor in the database 181. The weighted values for each question 445 can be the same or different for each question 445. In one embodiment, the responses can be weighted by assigning values of 2, 1, −1, and −2 respectively for the possible answers to the advisor profile matching questions 445, i.e., Strongly Agree 450A, Agree 450B, Disagree 450C, or Strongly Disagree 450D. In another embodiment, a user could expressly be given the ability to indicate which questions 445 should be given greater importance or weight in calculating a percent match value in the advisor matching algorithm. The percentage matching value can then be used to generate a list of advisors that best meet the user's search criteria.

Furthermore, in another embodiment, the weighted values assigned to the questions 445 answered by the user could be modified, either greater or lesser values, depending upon past responses to questions by the same or different users. Thus, the system would essentially learn what questions are more or less important to users and adjust the question 445 weights accordingly.

FIG. 4A shows a Web browser displaying the bottom portion of the third "My Profile" Web 410 of FIG. 4. Under the heading "Compensation Methods" 460, the user can select the method of payment for services he/she prefers. For example, the user has four choices labeled: asset fee 462, hourly fee 464, flat fee/retainer 466, and commissions 468. The user selects a choice by "clicking" the appropriate square window 465. In the embodiment of FIG. 4A, the user can chose any or all the choices but needs to select at least one of the choices. Those skilled in the art will recognize that other types of fee compensation for advisors may be available, for example profit sharing, reduced fee payments, etc. In addition, the heading "Compensation Methods" could be different, for example, "Fee Options", "Payment Options", etc.

Having selected the second search criteria 420, the user proceeds to the succeeding Web page screen by selecting the "Next" link 240. At this point, the first subset of advisors 415 in the server database 181 is queried to determine which professionals most closely match the second search criteria 420.

Figure 5:
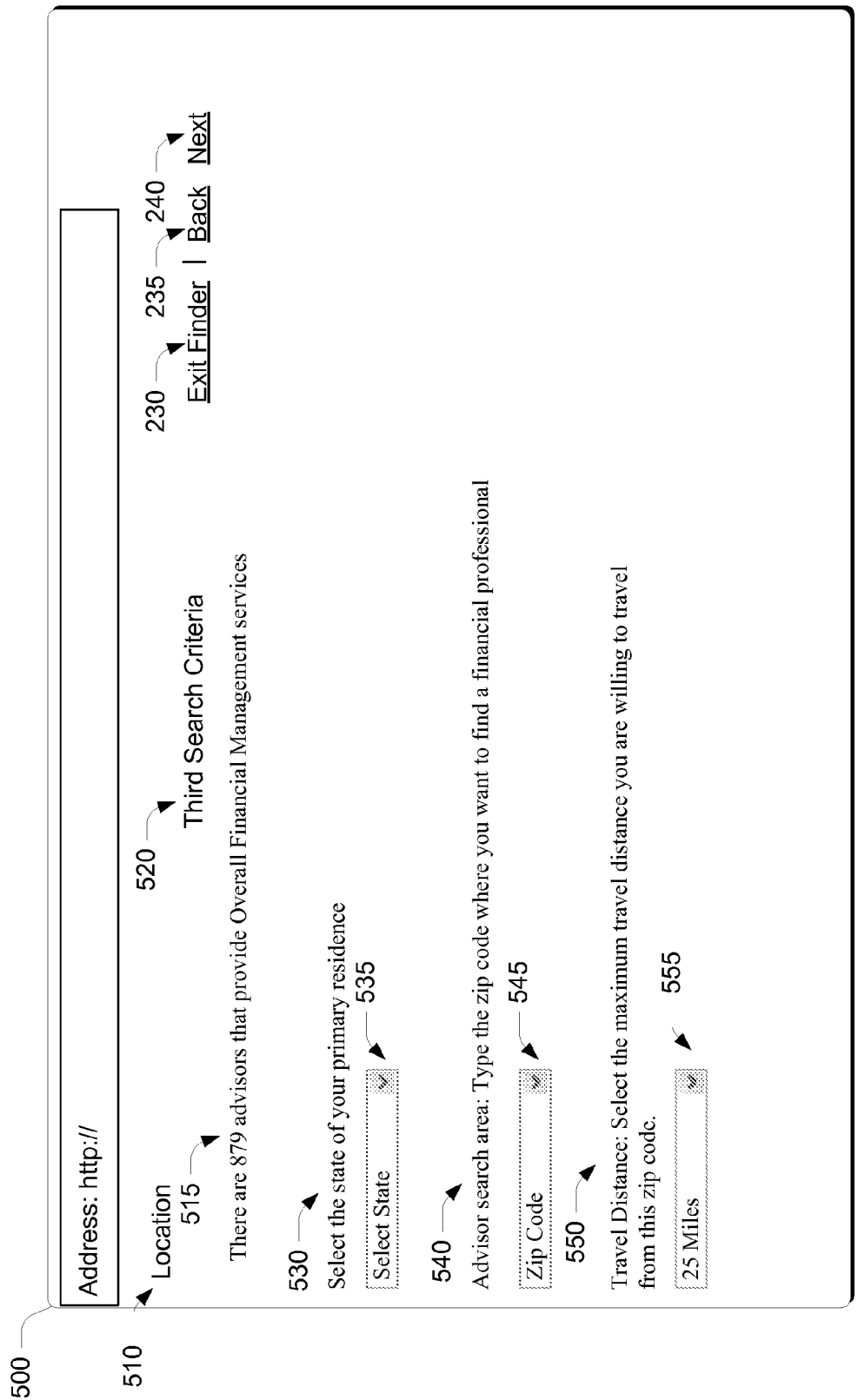
FIG. 5 shows a Web browser displaying a fourth "Location" Web page for selection of a third search criteria in accordance with some embodiments.

FIG. 5 shows an exemplary fourth Web page 500 known as the "Location" page 510. The fourth Web page 500 shows the results of the second query in the third Web page 400. The user is given a numerical indication of how many professionals from the queried first subset 415 in the server database 181 or 182 matched the user's second search criteria 420. The result is a second subset of advisors 515 from the server database 181. The second subset of advisors 515 typically has less advisors than the first subset 415. In the embodiment of FIG. 5, the user is only given an indication of the quantity of professionals that met the second search criteria 420 but in other embodiments part or all of the advisors in the second subset 515 can be displayed to the users. The fourth Web page 400 also has the "Exit Finder" 230, the "Back" 235, and the "Next" 240 hyperlinks.

The user may now create a third search criteria 520 that can be used to further query the second subset of advisors 515 in the server database 181. In this embodiment, the third search criteria 520 are comprised of a "Primary Residence" 530, an "Advisor Search Area" 540 and "Your Travel Distance" 550. Under the heading "Primary Residence" 530, the user selects the State 535 of the user's primary residence. Second, under the heading "Advisor Search Area" 540, the user enters a Zip Code 545 for the desired advisor location. The entered Zip code 545 can be used to further query the advisor in the second subset of advisor 515. The user can select a ZIP code 545 that is outside his/her State of residency to search for an out-of-state advisor. The user may desire such advisor if the user has a work office that is across a State line, e.g., where the user lives on one side of a state line and works in another State.

Last, under the heading "Your Travel Distance" 550, the user selects the maximum travel distance 555 that he/she is willing to travel from the entered Zip Code 545 to an advisor. In this embodiment, the user can choose a travel distance 555 of 25, 50 and 100 miles. Twenty-five miles is the default travel distance 555 value if no choice is made by the user. In one embodiment, the travel distance 550 is compared to the user entered zip code by accessing a zip code database (not shown) and comparing the latitude and longitudes of the centers of the entered zip code 545 against the selected user State of residency 535. Other distances can of course be used besides those of this embodiment. Those skilled in the art can recognize that the third search criteria 520 can be comprised of more or less criteria items, and that the zip code information, i.e., latitude and longitude, can also be part of the advisor database 181. For example, a certain street or a certain phone number prefix, etc.

Having selected the third search criteria 520, the user proceeds to the succeeding Web page screen by selecting the "Next" link 240. At this point, the second subset of advisors 515 in the main database 181 or 182 is queried further to determine which professionals most closely match the third search criteria 520.

Figure 6:
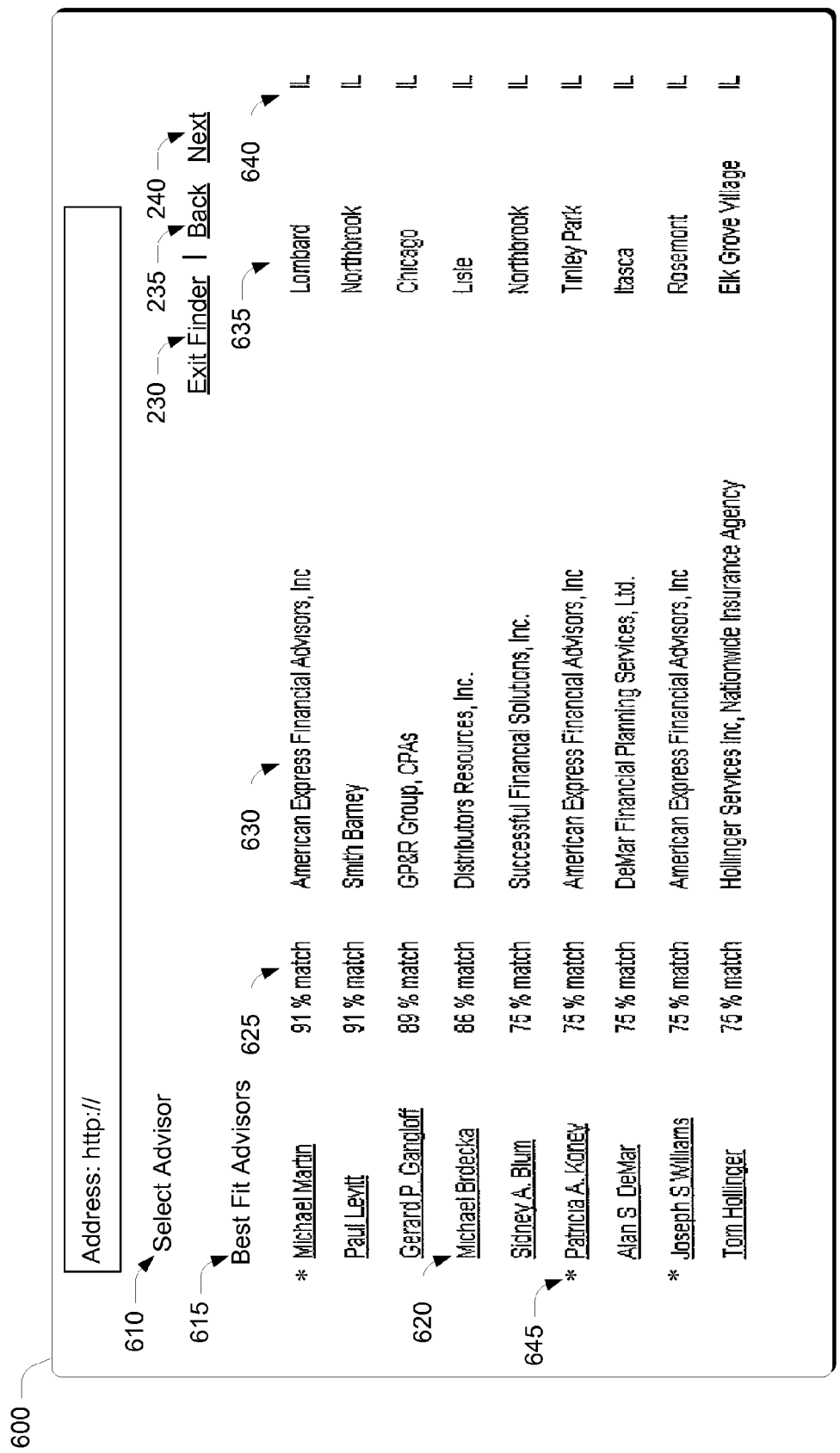
FIG. 6 shows a Web browser displaying a fifth "Select Advisor" Web page for display of a "Best Fit Advisors" list in accordance with some embodiments.

FIG. 6 shows an exemplary fifth Web page 600 known as the "Select Advisor" page 610. The fifth Web page 600 shows the results of the third query in the fourth Web page 500. During the third query under the third search criteria 520, the second subset of advisors 515 can be further narrowed to those advisors in the second subset 515 that match the third search criteria 520. The result is a third subset of advisors 937 (discussed with reference to FIG. 9) from the server database 181 or 182. The third subset of advisors typically has less advisors than the second subset 515. Once the third subset is created, an advisor matching algorithm 955 (discussed with reference to FIG. 9) can be executed. The advisor matching algorithm calculates the percent match (% match) 625 for each advisor in the newly created third subset of advisors 937.

The user is then presented with a listing of professionals under the heading "Best Fit Advisors" 615. The information comprised in the "Best Fit Advisor" 615 list may comprise the advisor's name 620, a DALBAR Rating 645 if any, a percent match 625 to user's third search criteria 520, the advisor's company or firm 630, and city 635 and State 640 location of the advisor. In the embodiment of FIG. 6, the final "Best Fit Advisor" 615 listing comprises the advisors listed in decreasing order of percent match (% match) 625. However, those skilled in the art can recognized that other information could be provided, e.g., phone number, nationality, race, years of experience, etc., or listed in increasing order of percent match 625.

Figure 9:
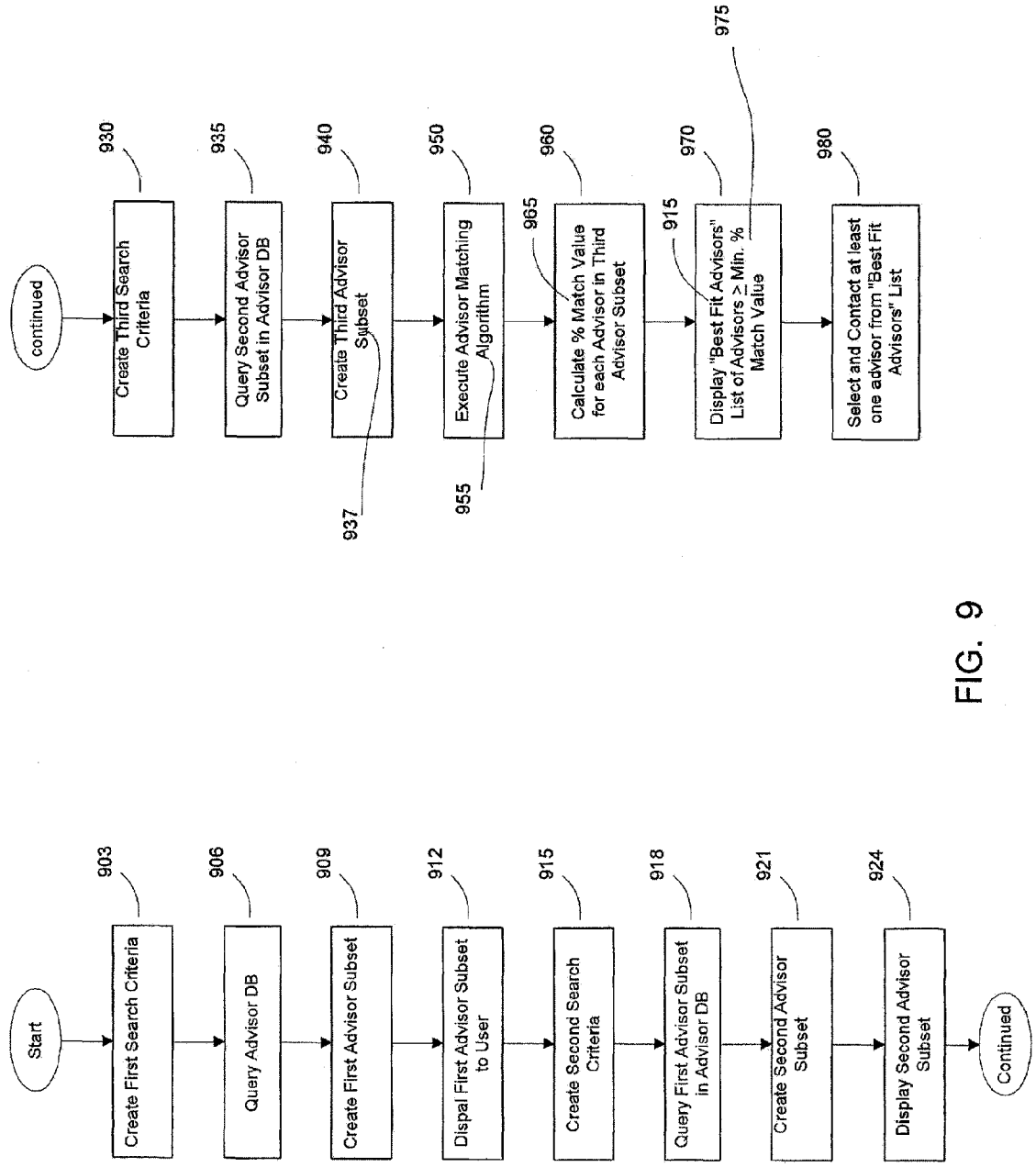
FIG. 9 shows a flow diagram illustrating an exemplary process of selecting advisors in accordance with some embodiments.

The "Best Fit Advisors" 615 list is a listing of professional advisors with a calculated percent match 625 that is equal to or greater than a predetermined minimum percent match 975 (shown in FIG. 9). In the embodiment of FIG. 6, the minimum percent match 975 for an advisor to appear on the lists is 50% for DALBAR rated advisor (if the user selected a DALBAR qualification rating in the first search criteria 320), and 75% for non-DALBAR rated advisor (if the user did not selected a DALBAR qualification rating in the first search criteria 320). Thus in the embodiment of FIG. 6, the minimum percent match 975 threshold to be listed on the "Best Fit Advisors" list 615 is lower for DALBAR Rated advisors (50%) than for non-DALBAR Rated advisors (75%). Those skilled in the art will readily recognize that the minimum percent match 975 of the advisor can be higher or lower depending on the desired content of the "Best Fit Advisors" lists 615.

If the user did not selected a qualification rating, e.g., a DALBAR Rating, in the first search criteria 320, as is the case in the embodiment shown in FIG. 6, the minimum percent match 975 for an advisor to be listed in the "Best Fit Advisors" list is 75%. Moreover, the "Best Fit Advisors" 615 list can include the top five advisors above a 75% match. There can be a special case where there is more than one advisor with the same percent match for the fifth and final spot on the list. In that case, the Best Advisor lists can have more than five advisors, e.g. as depicted in the present "Best Fit Advisor" 615 list. The list includes all advisors with the same percent match for the final spot in the list. For example, as shown, the list comprises a total of six advisors, wherein the last two advisors with an identical 75% match.

In another embodiment, where for example, the user selected a qualification rating such as a DALBAR Rating preference (i.e., by selecting the DALBAR Rating window 345 in the first Web page 300), the minimum percent match for a DALBAR Rated advisor to be comprised in the "Best Fit Advisors" 615 list is 50%. Again, the "Best Fit Advisors" 615 list can comprise five DALBAR Rated advisors above the 50% match. In this embodiment, the top five DALBAR Rated advisors meeting the minimum percent match would be listed in the "Best Fit Advisors" 615 list. And as before, if more than five DALBAR Rated advisors meet the minimum percent match, the top five advisors can be displayed. As before, where there is more than one DALBAR Rated advisor with the same percent match for the fifth and final spot on the list, the "Best Fit Advisor" 615 list can have more than five DALBAR Rated advisors. The list 615 can comprise all DALBAR Rated advisors with the same percent match in the fifth slot on the list.

In other embodiments, the percent match can be internally increased by, for example, adding some percentage points to each DALBAR rated advisor's percent match for the purposes of determining which advisors should be listed in the Best Fit Advisors list. In this embodiment, the top five rated advisors are listed regardless of whether they are DALBAR rated but the ratings for the DALBAR rated advisors are artificially increased when deciding who to list. For example, if advisor A is the fifth highest rated advisor with a rating of 75% but the sixth rated advisor (advisor B) is DALBAR rated and has a percent match of 60%, the advisor matching algorithm can add, for example, 20 percentage points to advisor B's score which would result in a percent match of 80%. In this case, advisor B would replace advisor A on the list. This can however be transparent to the user so that the ratings of the advisors shown to the user would not reflect the "bonus points" added for having a DALBAR or some other rating.

If there are less than five DALBAR Rated advisors meeting the minimum 50% match mark, each DALBAR rated advisors will be displayed in the list in this embodiment. The remaining list slots not allocated to DALBAR Rated advisors are allocated as before, i.e., the highest rated advisors above a 75% match are displayed in the final "Best Fit Advisors" 615 lists as discussed already. As mentioned already, the number of advisors listed on the "Best Fit Advisors" list 615 can be more or less than five and the minimum percent match can be other than 50% or 75%.

Referring again to the embodiment in FIG. 6, the user can now select one or more advisors from among the advisors that are displayed in the "Best Fit Advisors" 615 list and proceed to the next screen. The names 620 on the "Best Fit Advisors" are linked to a respective Web page that contains information about that particular advisor.

Figure 7:
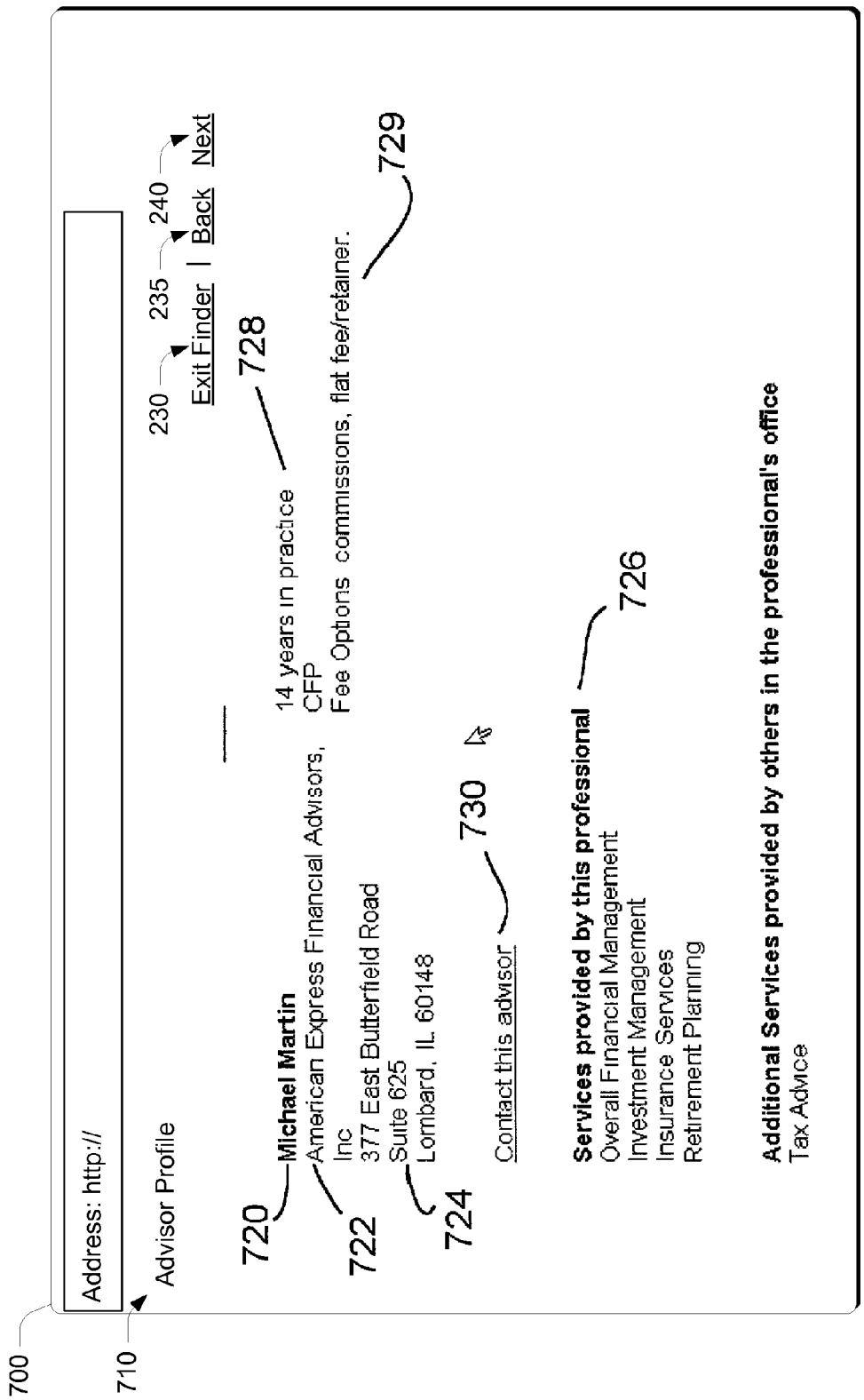
FIG. 7 shows a Web browser displaying a sixth "Advisor Profile" Web page in accordance with some embodiments.

FIG. 7 shows an exemplary sixth Web page 700 known as the "Advisor Profile" page 710. The "Advisor Profile" page 700 shows the particular linked Web page that corresponds to the particular advisor 620 chosen by the use from the "Best Fit Advisor" 615 list on the "Select Advisor" 610 page. The "Advisor Profile" 710 Web page displays detailed information about the selected advisor 620. The information can comprise the advisor's name 720, affiliated company 722, business address 724, type of services provided 726, years of experience 728 and fee payment information 729. However, those of skill in the art can recognize that other information could be provided, e.g., phone number, nationality, race, organization membership, etc. After reviewing the information, the user can choose to contact the displayed advisor by selecting the "Contact this advisor" link 730 or return to the "Best Fit Advisors" 615 list by selecting the "Back" link 235. If the user selects the "Back" link 235, he is returned to the previous "Select Advisor" screen 610 where he/she can select another advisor 620 from the "Best Fit Advisors" list 615. Otherwise, the user can select the "Contact this advisor" link 730 and proceed to the next screen.

Figure 8:
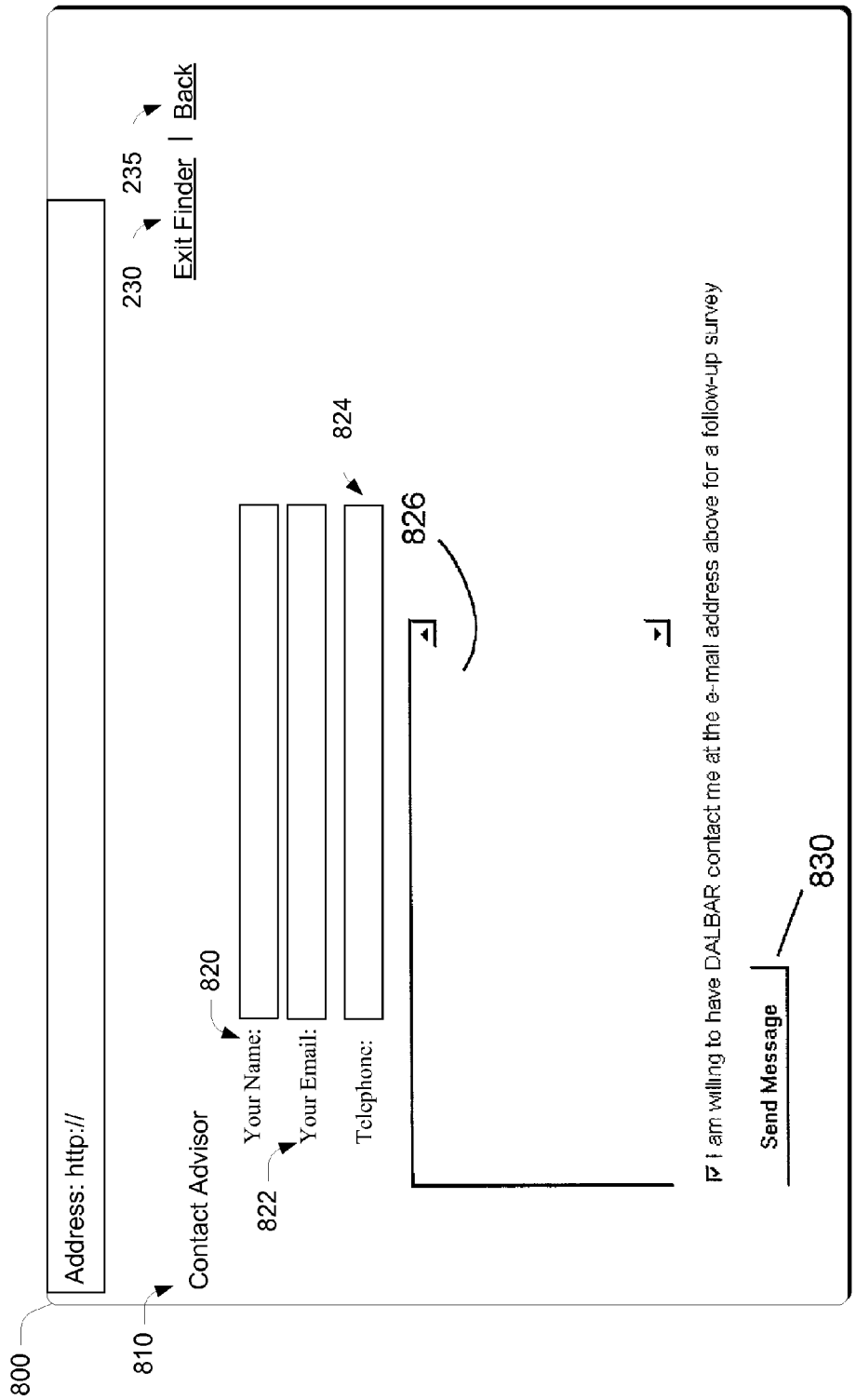
FIG. 8 shows a Web browser displaying a seventh "Contact Advisor" Web page in accordance with some embodiments.

FIG. 8 shows an exemplary seventh Web page 800 known as the "Contact Advisor" page 810. The "Contact Advisor" screen 810 allows the user to enter user information for submission to the selected advisor. The user can enter contact information, such as name 820, e-mail address 822 and telephone number 824. The user can also enter comments 826 for the advisor. Such comments 826 may help the advisor understand the user's need and the preferred way to contact the user. The user then sends his information to the advisor by selecting the "Send Message" 830 button or returns to the "Best Fit Advisors" list 615 by selecting the "Back" link 235 twice. If the user selects the "Back" link 235 twice, the user is returned to the "Select Advisor" 610 screen where the user can select another advisor 620 from the "Best Fit Advisors" 615 lists. Otherwise, the user can select the "Send Message" button 830. Once the user's data has been transmitted, an acknowledgement can be displayed informing the user that the information has been submitted. The selected advisor can then contact the user at a later date and time. The message may also be sent to a program administrator, such as Dalbar Inc., for record keeping and quality assurance, among other functions. The respective parties can then follow up on the message submitted by the user.

In some embodiments, the user may proceed in another fashion, other than sending an e-mail to an advisor. For example, instead of creating and sending an e-mail to the selected advisor, the user may be referred or linked to Web pages maintained by the selected advisors or the advisor's firms where more detailed information may be obtained.

At this point the user can exit the Advisor finder by selecting the "Exit Finder" link 230 or return to the "Best Fit Advisors" 615 list by selecting the "Back" link 235 twice. Additionally, the user can begin the advisor selection process from the beginning by returning to the second web page 300, i.e., the "Services" screen 310.

FIG. 9 shows a flow diagram illustrating an exemplary process of selecting advisors in accordance with some embodiments of the advisor referral tool. In a step 903 at the "Services" page 310, the user creates a first search criteria 320. In step 906, the advisor database 181 coupled to the Web server computer can be queried to determine which professionals match the first search criteria 320. In three 909, a first advisor subset 415 is created from the server database 181 based on the first search criteria 320.

In step 912 at the "My Profile" page 410, a numerical indication of the first advisor subset 415 is displayed. In step 915 at the "My Profile" page 410, the user creates a second search criteria 420 that can be used to further query the first subset of advisors 415. As mentioned previously with respect to FIG. 4, the user answers a series of predetermined matching profile statements, or psychographic questions 445. The user's answers are assigned numerical values that can be later used in calculating a percent match (% match) value in an advisor matching algorithm (discussed below). In some embodiments, weighted values of 2, 1, −1, and −2 respectively are assigned to the possible answers Strongly Agree 450A, Agree 450B, Disagree 450C, or Strongly Disagree 450D. Those of skill in the art can readily recognize that other values may be used to determine the percent match values in the advisor matching algorithm. For example, values of then those above could be assigned to answers such a zero value for "Neutral" or "Not Applicable".

In step 918, the first advisor subset 415 in the advisor database 181 can be queried to determine which professionals match the second search criteria 420. In step 921, a second advisor subset 515 is created from the first advisor subset 415 based on the second search criteria 420.

In step 924 at the "Location" page 510, a numerical indication of the second advisor subset 515 is displayed. In step 930 at the "Location" page 510, the user creates a third search criteria 520 that further queries the second advisor subset 415 in the server database 181. In step 935, the second advisor subset 415 is queried to determine which professionals match the third search criteria 520. In step 940, a third advisor subset 937 is created from the second advisor subset 515 based on the third search criteria 520.

In step 950, an advisor matching algorithm 955 is executed by the remote Web server computer 109 (shown in FIG. 1). The advisor matching algorithm 955 uses the user's weighted responses in calculating a percent match (% match) value 965. In one embodiment, the responses are weighted by assigning values of 2, 1, −1, and −2 respectively for the possible answers to the advisor profile matching questions 445, i.e., Strongly Agree 450A, Agree 450B, Disagree 450C, or Strongly Disagree 450D. As noted above other answers and values could be used.

In thirteen 960, a percent match (% match) value 955 is calculated by the executed advisor matching algorithm 955, for each advisor in the third advisor subset 937. In order to provide skilled artisans with a detailed example of some embodiments, certain detailed portions of the executed advisor matching algorithm 955 used to calculate the percent match value 965 discussed with reference to FIG. 9 is set forth in Appendix A.

In step 970 at the "Select Advisor" page 610, the user is presented with a listing of professional advisors under the heading "Best Fit Advisors" 615. The listed advisors 620 are advisors from the third subset 937 that have a percent match value 965 that is greater than or equal to the predetermined minimum percent match value 975. In one embodiment, the final "Best Fit Advisor" 615 listing comprises the advisors 620 listed in decreasing order of percent match (% match) 625 and the minimum percent match value 975 for DALBAR rated and non-DALBAR rated advisor is 75% and 50% respectively. In step 980 at the "Select advisor" page 610, the user selects, by "clicking", the advisor 620 he/she wishes to learn more information about for contacting in the future.

Figure 10:
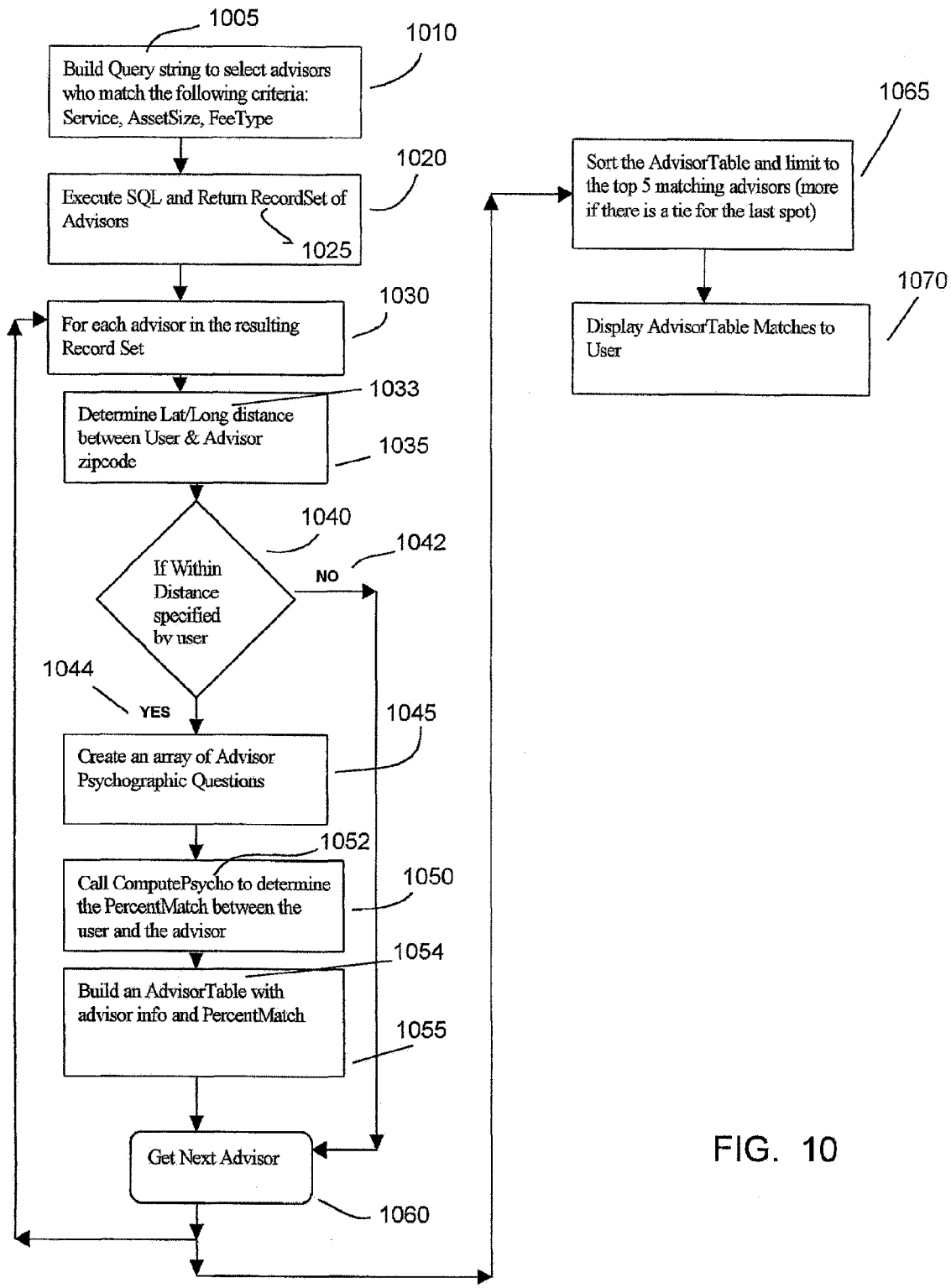
FIG. 10 shows a flow diagram illustrating an exemplary process of selecting advisors in accordance with some embodiments.

FIG. 10 shows a flow diagram illustrating an exemplary process for selecting advisors in accordance with some embodiments that is similar to the process discussed with respect to FIG. 9.

In step 1010, the user creates or builds a query string 1005. The query string 1005 can be comprised of the service desired, the user's asset size and the fee type among other criteria. Compared to the process of FIG. 9, the query string 1005 correlates to the first 903 and second 915 search criteria. At step 1020, the advisor database 181 coupled to the Web server computer can be queried to determine which professionals match the query string 1005. A RecordSet of advisors 1025 is created from the server database 181 based on the query string 1005 and is typically a subset of the advisors in the advisor database 181.

In step 1030, steps 1035 through 1060 are carried out for each advisor in the RecordSet of advisors 1025. The user creates another search criteria, similar to the third search criteria 520 of FIG. 9, to further query the RecordSet 1005. As mentioned previously, the criteria can include the user's primary residence, an advisor search zip code, and a maximum user travel distance to the advisor. In step 1035, the latitude and longitude (Lat/Long) distance 1033 between the user and the particular advisor in the RecordSet 1025 is determined. As mentioned before, the distances can be compared by accessing a zip code database (not shown) and comparing the latitude and longitudes of the entered zip code 545 against the selected user State of residency 535.

In step 1040, the Lat/Long distance 1033 is calculated between user and advisor zip codes. The Lat/Long distance 1033 is then compared against the user defined maximum distance. If the answer is NO 1042, the next advisor, if any, in the RecordSet 125 is selected. If the answer is YES 1044, an array of advisor psychographic questions is created at step 1045. In step 1050, a ComputePsycho routine 1052 is then executed to determine or calculate the percent match value 965 (shown in FIG. 9) between the user and the advisor. In step 1055, an AdvisorTable 1054 with advisor information and corresponding percent match value 965 is created. In step 1060, the process can be repeated for the remainder of the advisors in the RecordSet 1033.

Once each advisor in the RecordSet 1033 has been tested, the AdvisorTable 1054 is sorted. As discussed already in one embodiment, the AdvisorTable 1065 is sorted such that the top five matching advisors are selected, and more than five advisors if there is a tie for the last spot on the list. In step 1070, the sorted AdvisorTable 1054 matches are displayed to the user. As already discussed, the user can then contact or be contacted by the advisor of his choice.

Figure 11:
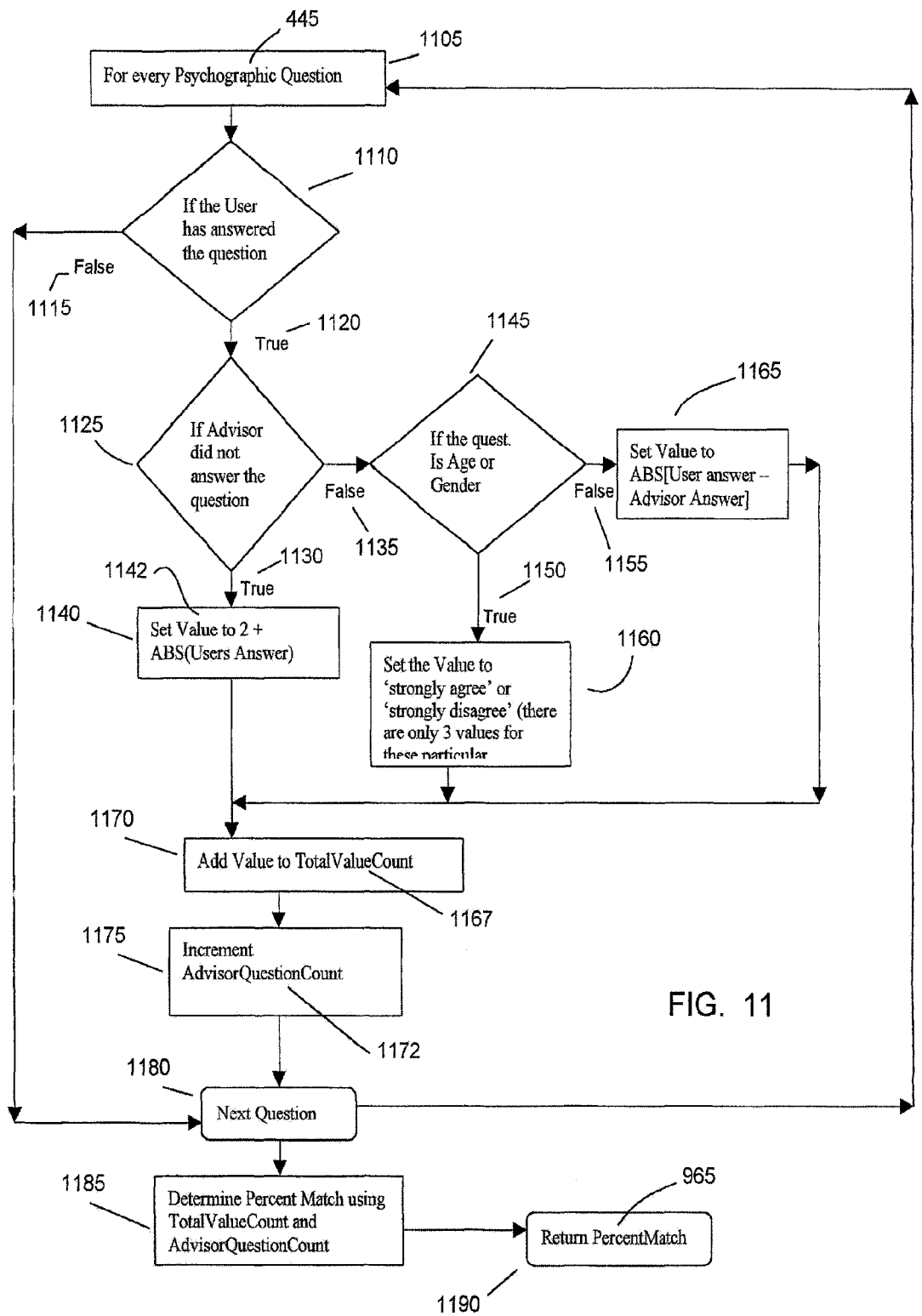
FIG. 11 shows a block diagram illustrating an exemplary process of calculating a percent match value in accordance with some embodiments.

FIG. 11 shows a more detailed block diagram illustrating an exemplary algorithm process of calculating a percent match value 965 (shown in FIG. 9) in accordance with some embodiments. The calculation of the percent match value 965 could be a subroutine of either step 960 of FIG. 9 or step 1050 of FIG. 10. The exemplary algorithm of FIG. 11 can be used to calculate the percent match value 965 for each advisor in the third advisor subset 937 (shown in FIG. 9) discussed previously. Also, the exemplary algorithm of FIG. 11 can be used to calculate the percent match value 965 for each advisor in the RecordSet 1025 that meets the Lat/Long distance 1033 specified by the user at step 1040 (shown in FIG. 10).

Again referring to FIG. 11, step 1105 indicates that the percent match routine is executed for each and every psychographic question 445 even though the user may not have answered all the psychographic questions 445 (shown in FIG. 4) in creating advisor search criteria. The subroutine shown in FIG. 11 is executed for each psychographic question 445 one after the other. As previously mentioned, in one embodiment, at least five of eleven questions 445 are typically answered by the user and the questions 445 are given predetermined weighted values.

In step 1110, a determination is made as to whether a particular psychographic question 445 was answered. If answer is FALSE 1115, the user has not answered the questions and the algorithm goes to the next question 1180. The algorithm then goes to step 1105 if there are more questions to be matched with advisor responses to corresponding questions 445. If there are no more questions 445 remaining, the percent match value 965 is determined using the TotalValueCount 1167 and the AdvisorQuestionCount 1172.

If the answer for step 1110 is TRUE 1120, a determination is next made, at step 1125, as to whether the particular advisor did not answer the corresponding question 445 answered by the user. If the answer is TRUE 1130, the variable labeled "Value" 1142 is set to 2 plus the absolute value of the user's answer to that particular question, i.e., Value=2+ABS (weighted value of user's answer). The algorithm then proceeds to a variable labeled TotalValueCount 1167 at step 1170.

If the answer, at step 1125, is FALSE 1135, a determination, at step 1145, is made whether the psychographic question 445 relates to Age or Gender. If the answer at step 1145 is TRUE 1150, the variable labeled "Value" 1142 is set to "Strongly Agree" or "Strongly Disagree", for example Value=2 or −2 respectively in one embodiment. The algorithm then proceeds to a variable labeled TotalValueCount 1167 at step 1170.

If the answer at step 1145 is FALSE 1155, the variable labeled "Value" 1142 is set to the absolute value of the weighted user's answer minus the weighted value of the advisor's answer to the corresponding psychographic question 445, i.e., Value=ABS (weighted value of user's answer−weighted value of advisor's answer). The algorithm then proceeds to a variable labeled TotalValueCount 1167 at step 1170.

At step 1170, the "Value" 1142 set at one of three steps, i.e., 1140, 1160, and 1165, is added to a running counter labeled "TotalValueCount" 1167. The AdvisorQuestionCount 1172 is then incremented by one at step 1175.

In step 1180, the algorithm can be repeated for any remaining psychographic questions 445 by proceeding to step 1105. If there are no more psychographic questions 445 remaining, the algorithm proceeds to step 1185. At step 1185, the percent match value 965 is determined using the TotalValueCount 1167 and the AdvisorQuestionCount 1172. The percent match value 965 can then be returned, at step 1190, to build an AdvisorTable 1045 (shown in FIG. 10) or to create a "Best Fit Advisors" list (shown in FIG. 9).

In order to provide those skilled in the art with a detailed example of the algorithm of FIGS. 10 and 11, certain detailed portions of the an advisor matching algorithm 955 used to calculate the percent match value 965 are set forth in Appendix A, but embodiments are not limited thereto.

It should be understood that embodiments have been described herein with reference to specific embodiments thereof It can be apparent to those skilled in the art that a person understanding some embodiments may conceive of changes or other embodiments or variations, which utilize the principles of certain embodiments without departing from the broader spirit and scope of the claimed subject matter. All are considered within the sphere, spirit and scope of the embodiments. The specification and drawings are, therefore, to be regarded in an illustrative rather than restrictive sense. Accordingly, it is not intended that embodiments be limited except as may be necessary in view of the claims as set forth herein.

APPENDIX A

```
<B>Best Fit Advisors</B><br>
<table WIDTH=90% border="1" cellpadding="3" bordercolor="#CCCC99"
bordercolordark="White" frame="BELOW" rules="ROWS">
<%
    if (fcontinue)
    {
        var sqlQuery2 = "";
        var strOr = false;
        //sleight of hand here to make field names line up.
        if (service != "null")
        {
        if (service == "estateAttorney")
        {
            sqlQuery2 += " AND (estatePlanning = 'A'"
                + ")"
        }else if (service == "businessSuccession")
        {
            sqlQuery2 += " AND (estateAttorney = 'A'"
                + ")"
        } else
        {
            sqlQuery2 += " AND (" + service + " = 'A'"
                + ")"
        }
        }
        if (portfolio != 0)
        {
        if (service != "businessSuccession") {
            sqlQuery2 += " AND ((" + portfolio + " > 
                MinimumAssets)";
                if (service == "overallFinancialManagement" ||
service ==
"investmentManagement" || service == "retirementPlanning")
        {
                    if (portfolio == 249999)
                    {
                       sqlQuery2 += " AND (MinimumAssets >
                          49999)";
                    }
                    else if (portfolio == 499999)
                    {
                       sqlQuery2 += " AND (MinimumAssets >
                          124999)";
                    }
                    else if (portfolio == 999999)
                    {
                       sqlQuery2 += " AND (MinimumAssets >
                          249999)";
                    }
                    else if (portfolio == 1000001)
                    {
                       sqlQuery2 += " AND (MinimumAssets >
                          499999)";
                    }
                 }
                 sqlQuery2 += ")";
        }
    }
sqlQuery2 += " AND ("
if (assetFee == "yes")
{
    sqlQuery2 += "AssetFee = '1'";
    strOr = true;
}
if (hourlyFee == "yes")
{
    if (strOr) sqlQuery2 += " OR ";
    sqlQuery2 += "HourlyFee = '1'";
    strOr = true;
}
if (flatFee == "yes")
{
    if (strOr) sqlQuery2 += " OR ";
    sqlQuery2 += "FlatFee = '1'";
    strOr = true;
}
if (commissions == "yes")
{
    if (strOr) sqlQuery2 += " OR ";
    sqlQuery2 += "Commissions = '1'";
```

APPENDIX A-continued

```
}
    sqlQuery2 += ")"
    sqlQuery = 'SELECT '
        + 'dalbar.AvailableStates, '
        + 'dalbar.Zip, '
        + 'dalbar.DALBARRated, '
        + 'dalbar.overallFinancialManagement, '
        + 'dalbar.taxAdvice, '
        + 'dalbar.retirementPlanning, '
        + 'dalbar.estatePlanning AS estateAttorney , '
        + 'dalbar.estateAttorney AS businessSuccession, '
        + 'dalbar.insuranceServices, '
        + 'dalbar.investmentManagement, '
        + 'dalbar.Psycho1, '
        + 'dalbar.Psycho2, '
        + 'dalbar.Psycho3, '
        + 'dalbar.Psycho4, '
        + 'dalbar.Psycho5, '
        + 'dalbar.Psycho6, '
        + 'dalbar.Psycho7, '
        + 'dalbar.Psycho8, '
        + 'dalbar.Psycho9, '
        + 'dalbar.Psycho10, '
        + 'dalbar.Psycho11, '
        + 'dalbar.indexid, '
        + 'dalbar.Address1, '
        + 'dalbar.City, '
        + 'dalbar.PrimaryContact, '
        + 'year = year(GETDATE( )) - year(dalbar.DateofBirth), '
        + 'dalbar.Gender, '
        + 'dalbar.indexid, '
        + 'dalbar.Firm, ';
if (country == "us")
{
    sqlQuery += ""
        + 'dalbar.State, '
        + 'Zip.lat, Zip.long '
        + 'FROM dalbar, Zip '
        + 'WHERE dalbar.Zip = Zip.zipcode AND '
        + 'dalbar.AvailableStates like '+ " '%" + stateName + "%' ";
}
else
{
    sqlQuery += ""
        + 'dalbar.Province, '
        + 'dalbar.PostalCode '
        + 'FROM dalbar '
        + 'WHERE '
        + 'dalbar.AvailableProvinces like '+ " '%" + stateName + "%' ";
}
sqlQuery = sqlQuery + sqlQuery2 + ";";
if (debug == 1)
{
    Response.write("portfolio = " + portfolio + "<P>")
        Response.write(sqlQuery);
}
var ado2
var firstIndex = 0;
ado2 = CreateConnectionWrapper("bankrate", "brm_user", "moneyinsider",
true);
rstPlanners = ExecuteWrapper(ado2, sqlQuery, true);
fcontinue = false;
while (!GlobalWebquote.ADORecordsetEOF(rstPlanners))
{
    if (country == "us")
    {
        distance = LLDistance(
                GlobalWebquote.ADOGetValue(rstUserZip, "lat"),
                GlobalWebquote.ADOGetValue(rstUserZip, "long"),
                GlobalWebquote.ADOGetValue(rstPlanners, "lat"),
                GlobalWebquote.ADOGetValue(rstPlanners, "long")
                );
        if (debug == 1)
        {
            Response.write("<P>" + distance + "<P>")
        }
    }
    if (country == "canada" || distance <= userDistance)
    {
        fcontinue = true;
```

APPENDIX A-continued

```
        var psycho = new makeArray(numQuestions);
psycho[0] =
        GlobalWebquote.ADOGetValue(rstPlanners, "Psycho1");
psycho[1] =
        GlobalWebquote.ADOGetValue(rstPlanners, "Psycho2");
psycho[2] =
        GlobalWebquote.ADOGetValue(rstPlanners, "Psycho3");
psycho[3] =
        GlobalWebquote.ADOGetValue(rstPlanners, "Psycho4");
psycho[4] =
        GlobalWebquote.ADOGetValue(rstPlanners, "Psycho5");
psycho[5] =
        GlobalWebquote.ADOGetValue(rstPlanners, "Psycho6");
psycho[6] =
        GlobalWebquote.ADOGetValue(rstPlanners, "Psycho7");
psycho[7] =
        GlobalWebquote.ADOGetValue(rstPlanners, "Psycho8");
psycho[8] =
        GlobalWebquote.ADOGetValue(rstPlanners, "Psycho9");
if (rstPlanners.Fields("Gender") == "F")
{
   psycho[9] = 1;
}
else
{
   psycho[9] = -1;
}
if (GlobalWebquote.ADOGetValue(rstPlanners, "year") <= 0 ||
    GlobalWebquote.ADOGetValue(rstPlanners, "year") == null)
{
   psycho[10] = 0;
}
else if (GlobalWebquote.ADOGetValue(rstPlanners, "year") >= 45)
{
   psycho[10] = 1;
}
else
{
   psycho[10] = -1;
}
result = computePsycho(
                psycho,
                questions,
                numQuestions,
        GlobalWebquote.ADOGetValue(rstPlanners, "indexid")
                );
addTable(
    GlobalWebquote.ADOGetValue(rstPlanners, "indexid"),
    GlobalWebquote.ADOGetValue(rstPlanners, "Address1"),
    GlobalWebquote.ADOGetValue(rstPlanners, "City"),
    GlobalWebquote.ADOGetValue(rstPlanners, "State"),
    GlobalWebquote.ADOGetValue(rstPlanners, "Zip"),
    GlobalWebquote.ADOGetValue(rstPlanners, "PrimaryContact"),
    GlobalWebquote.ADOGetValue(rstPlanners, "Firm"),
    GlobalWebquote.ADOGetValue(rstPlanners, "DALBARRated"),
            result
                );
        }
        GlobalWebquote.ADOMoveNext(rstPlanners);
}
GlobalWebquote.ADOCloseRecordSet(rstUserZip)
rstUserZip = 0;
GlobalWebquote.ADOCloseConnection(ado2)
ado2 = 0;
countDisplayed = 0;
arraySort( table, descending );
if (firstIndex == 0 && table.length != 0)
{
   firstIndex = table[0].index;
   Response.Write(""
                + "<!--"
                + "<script language=javascript>"
                + "var sto = parent;"
                + "sto.selection = " + firstIndex
                + "</script>"
                + "-->"
                );
}
if (dalbarRated != "yes")
{
for (i = 0; i < table.length; i++)
{
   if (countDisplayed < 5)
   {
      buildDisplay(table[i].index,
                table[i].address,
                table[i].city,
                table[i].state,
                table[i].zip,
                table[i].primaryContact,
                table[i].firm,
                table[i].DALBARRated,
                table[i].value
                );
      countDisplayed++;
   }
   else
   {
      var j = i - 1;
      while (true)
      {
         if (i > 1 &&
             i < table.length &&
             table[i].value == table[j].value)
         {
            buildDisplay(table[i].index,
                table[i].address,
                table[i].city,
                table[i].state,
                table[i].zip,
                table[i].primaryContact,
                table[i].firm,
                table[i].DALBARRated,
                table[i].value
                );
            i++;
         }
         else
         {
            break;
         }
      }
      break;
   }
}
}
else
{
   for (i = 0; i < table.length; i++)
   {
      if (table[i].DALBARRated == 1)
      {
         ratedCounter++;
      }
   }
   if (ratedCounter > 5)
   {
      ratedCounter = 5;
   }
   notRatedCounter = 5 - ratedCounter;
   for (i = 0; i < table.length; i++)
   {
      if (table[i].DALBARRated == 1)
      {
         if (ratedCounter > 0)
         {
            buildDisplay(table[i].index,
                table[i].address,
                table[i].city,
                table[i].state,
                table[i].zip,
                table[i].primaryContact,
                table[i].firm,
                table[i].DALBARRated,
                table[i].value
                );
            ratedCounter--;
            countDisplayed++;
         }
         else if (countDisplayed == 5)
```

APPENDIX A-continued

```
    {
      var j = i − 1;
      while (true)
      {
        if (i > 1 &&
          i < table.length &&
          table[i].value == table[j].value &&
          table[i].DALBARRated == table[j].DALBARRated)
        {
          buildDisplay(table[i].index,
                table[i].address,
                table[i].city,
                table[i].state,
                table[i].zip,
                table[i].primaryContact,
                table[i].firm,
                table[i].DALBARRated,
                table[i].value
                );
          i++;
        }
        else
        {
          break;
        }
      }
      break;
    }
  }
  else
  {
    if (notRatedCounter > 0)
    {
      buildDisplay(table[i].index,
            table[i].address,
            table[i].city,
            table[i].state,
            table[i].zip,
            table[i].primaryContact,
            table[i].firm,
            table[i].DALBARRated,
            table[i].value
            );
      notRatedCounter--;
      countDisplayed++;
    }
    else if (countDisplayed == 5)
    {
      var j = i − 1;
      while (true)
      {
        if (i > 1 &&
          i < table.length &&
          table[i].value == table[j].value &&
          table[i].DALBARRated == table[j].DALBARRated)
        {
          buildDisplay(table[i].index,
                table[i].address,
                table[i].city,
                table[i].state,
                table[i].zip,
                table[i].primaryContact,
                table[i].firm,
                table[i].DALBARRated,
                table[i].value
                );
          i++;
        }
        else
        {
          break;
        }
      }
      break;
    }
  }
}
else
```

APPENDIX A-continued

```
    {
      GlobalWebquote.ADOCloseRecordSet(rstUserZip)
      rstUserZip = 0;
      GlobalWebquote.ADOCloseConnection(ado)
      ado = 0;
    }
    if (!fcontinue)
    {
      Response.Write(""
            + "<tr><td>"
            + "There are no advisors that fit this criteria."
            + "</td></tr>"
            );
    }
    Response.Write(""
          + "</table>"
          + "</td>"
          + "</tr>"
          + "<tr>"
          + "<td>"
          + " "
          + "</td>"
          + "<td>");
%>
<BR><BR>
<span class=smallprompt>
function computePsycho( p, q, numQuestions, id )
{
  var i;
  var count = 0;
  var total = 0;
  var value = 0;
if (false)
{
    Response.Write(""
            + "<BR>Compute psycho-grahic criteria<BR>"
            );
}
for (i = 0; i < numQuestions; i++)
{
    if (q[i] != 0)
    {
      if (p[i] == 0)
      {
        value = 2 + Math.abs(q[i]);
      }
      else
      {
        value = Math.abs(q[i] − p[i]);
        if ((i == 9 || i == 10) && value == 1)
        {
          value = 0;
        }
        if (false)
        {
          Response.Write(""
                + "User #: " + id
                + " Question #: " + i
                + " q " + q[i]
                + " p = " + p[i]
                + " Value = " + value + "<BR>"
                );
        }
      }
      total += value;
      count++;
    }
}
if (count > 0)
{
    value = ((4 * count − total) / (4 * count)) * 100;
}
else
{
    value = 0;
}
if (false)
{
    Response.Write(""
            + "<BR>The total is " + total + "<BR>"
```

APPENDIX A-continued

```
        + "<BR>The count is " + count + "<BR>"
        + "<BR>The value is " + value + "<BR>"
        );
    }
    return value;
}
```

What is claimed is:

1. One or more computer readable-media comprising instructions that, responsive to being executed by a computing system, cause the computing system to:
   identify a set of investment advisors based on a first set of criteria developed in response to receipt of one or more answers to investment-related questions;
   identify a subset of investment advisors from the set of investment advisors based on a second set of criteria developed in response to receipt of one or more of:
      a revised answer to at least one of the investment related questions;
   or
      an answer to an additional investment related question; and
   cause to be available for display a list of names of investment advisors that are included in the subset.

2. The one or more computer readable-media of claim 1, wherein one or more of the investment-related questions pertain to a qualification rating.

3. The one or more computer readable-media of claim 2, wherein the qualification rating comprises one or more of professional standards rating, a state certification, or an organizational membership.

4. The one or more computer readable-media of claim 1, wherein the investment-related questions pertain to one or more of a type of professional service, an advisor matching profile, a compensation method, a primary residence location, or a travel distance.

5. The one or more computer readable-media of claim 1, wherein one or more criteria of the first set of criteria or the second set of criteria are weighted, and wherein the list of names of investment advisors is presented based at least in part on a weight associated with each of the one or more criteria.

6. The one or more computer readable-media of claim 1, wherein the list of names of investment advisors is configured to be presented in an order according to a percentage match value with respect to one or more of the first set of criteria or the second set of criteria.

7. The one or more computer readable-media of claim 1, wherein one or more names in the list of names of investment advisors is configured to be selectable to obtain more information about a respective investment advisor.

8. One or more computer readable-media comprising instructions that, responsive to being executed by a computing system, implement a method comprising:
   identifying a set of services based on criteria developed in response to receipt of one or more answers to service-related questions;
   identifying a subset of services from the set of services based on additional criteria developed in response to receipt of one or more of:
      a revised answer to at least one of the service-related questions; or
      an answer to an additional service-related question; and
   causing to be available for display a list of one or more of the services that are included in the subset.

9. The one or more computer readable-media of claim 8, wherein the set of services pertain to one or more of tax services, insurance services, investment services, retirement services, or estate planning services.

10. The one or more computer readable-media of claim 8, wherein the services that are included in the subset are identified at least in part based on a percentage match value with respect to the one or more answers to service-related questions and one or more of:
    the revised answer to at least one of the service-related questions; or
    the answer to the additional service-related question.

11. The one or more computer readable-media of claim 8, wherein the service-related questions pertain to one or more of a type of professional service, a qualification rating, a rating profile, an advisor matching profile, a compensation method, a primary residence, a search area, or a travel distance.

12. The one or more computer readable-media of claim 11, wherein the qualification rating comprises one or more of professional standards rating, a state certification, or an organizational membership.

13. The one or more computer readable-media of claim 8, wherein the list of the one or more of the services that are included in the subset includes a plurality of services and where the plurality of services are presented in an order based on a percentage match of each of the plurality of services to the one or more answers to service-related questions and one or more of:
    the revised answer to at least one of the service-related questions; or
    the answer to the additional service-related question.

14. The one or more computer readable-media of claim 8, wherein the one or more of the services that are included in the subset are selectable to obtain more information about the one or more of the services that are included in the subset.

15. One or more computer readable-media comprising instructions that, responsive to being executed by a computing system, cause the computing system to generate a graphical interface configured to:
    receive input including answers to a first set of service-related questions, the first set of service-related questions being configured to identify a set of professional services;
    present a second set of service-related questions, the second set of service-related questions including one or more of:
       a revised version of one or more questions of the first set of service-related questions; or
       an additional service-related question; and
    cause to be displayed a subset of the professional services, the subset being identified based at least in part on one or more answers to the second set of service-related questions.

16. The one or more computer readable-media of claim 15, wherein the set of professional services pertains to one or more of tax services, insurance services, investment services, retirement services, or estate planning services.

17. The one or more computer readable-media of claim 15, wherein one or more of the first set of service-related questions or the second set of service-related questions pertain to one or more of a type of professional service, a qualification rating, a rating profile, an advisor matching profile, a compensation method, a primary residence, a search area, or a travel distance.

18. The one or more computer readable-media of claim 17, wherein the qualification rating comprises one or more of professional standards rating, a state certification, or an organizational membership.

19. The one or more computer readable-media of claim 15, wherein the subset of professional services is configured to be presented in an order based at least in part on a percentage match of each professional service of the subset of professional services to one or more service-related questions of the first set of service-related questions or the second set of service-related questions.

20. The one or more computer readable-media of claim 15, wherein the graphical interface is further configured to enable one or more professional services of the subset of professional services to be selectable to obtain more information about the one or more professional services.

* * * * *